United States Patent

[11] 3,583,762

| | | | | | |
|---|---|---|---|---|---|
| [72] | Inventor | Werner Strien Stuttgart-Heumaden, Germany | [50] | Field of Search............................................ | 297/380, 377, 382, 354, 355, 356, 361, 458, 454 |
| [21] | Appl. No. | 817,683 | | | |
| [22] | Filed | Apr. 21, 1969 | [56] | References Cited | |
| [45] | Patented | June 8, 1971 | | UNITED STATES PATENTS | |
| [73] | Assignee | Recaro Aktiengesellschaft Glarus, Switzerland | 2,498,106 | 2/1950 Elleman ...................... | 297/354 |
| | | | 2,530,924 | 11/1950 Turner ........................ | 297/356 |
| [32] | Priority | Apr. 27, 1968 | 2,931,640 | 4/1960 Riddle.......................... | 297/380 |
| [33] | | Germany | 2,947,350 | 8/1960 Davis............................ | 297/355 |
| [31] | | P 17 55 333.2 | 3,046,055 | 7/1962 Martens ...................... | 297/361 |
| | | | 3,044,830 | 7/1962 Kolle............................ | 297/361 |

*Primary Examiner*—Reinaldo P. Machado
*Attorney*—Ernest G. Montague

[54] SEAT FOR A MOTOR VEHICLE
11 Claims, 7 Drawing Figs.

[52] U.S. Cl...................................................... 297/361, 297/382, 297/458, 297/459
[51] Int. Cl...................................................... B60n 1/06

ABSTRACT: A seat similar to a bucket seat but with the back rest adjustable to different inclinations relative to the seat part.

PATENTED JUN 8 1971 3,583,762
SHEET 1 OF 2
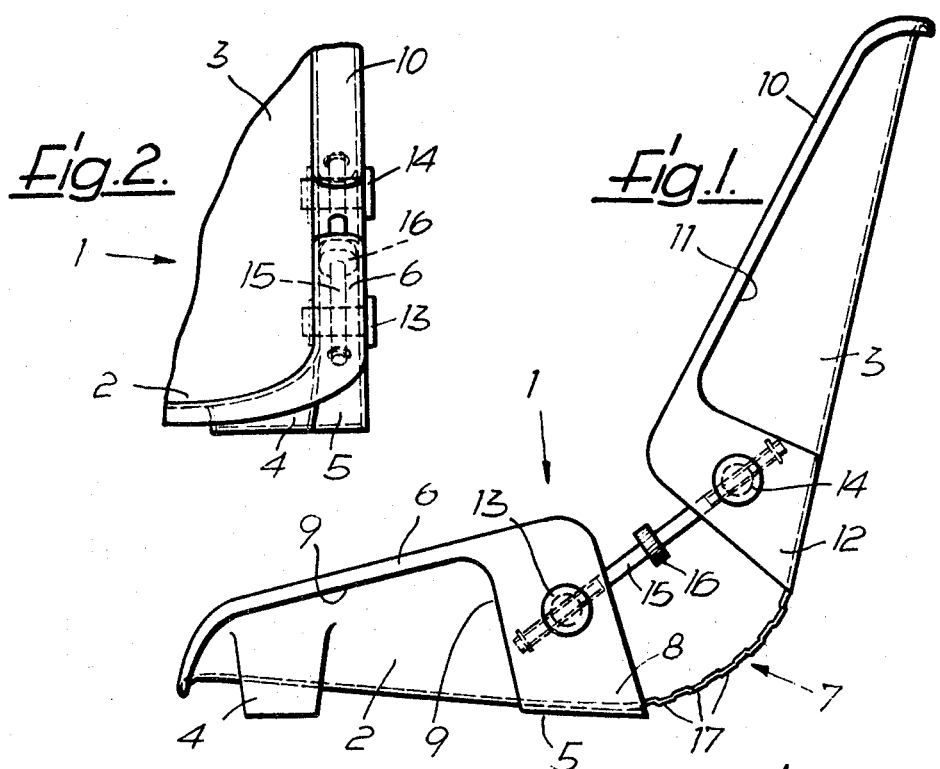
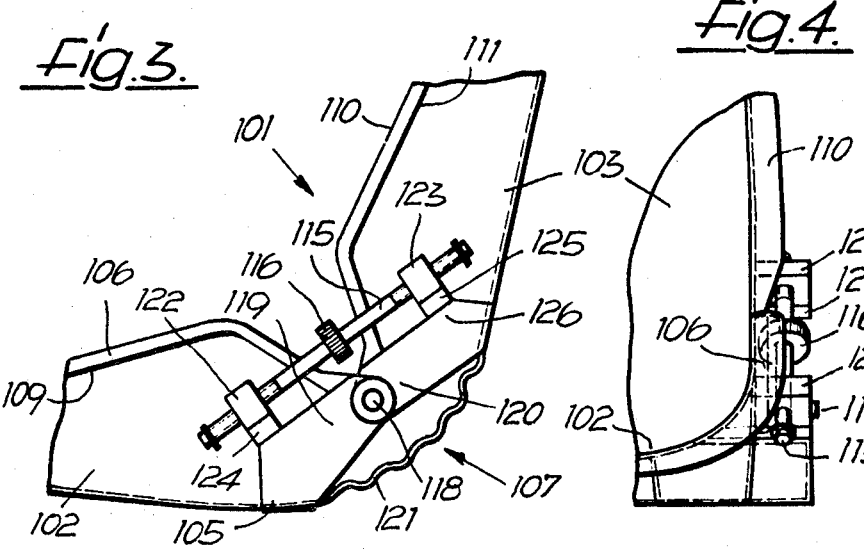
Inventor:
Werner Strien
By: Ernest J. Montague
Attorney

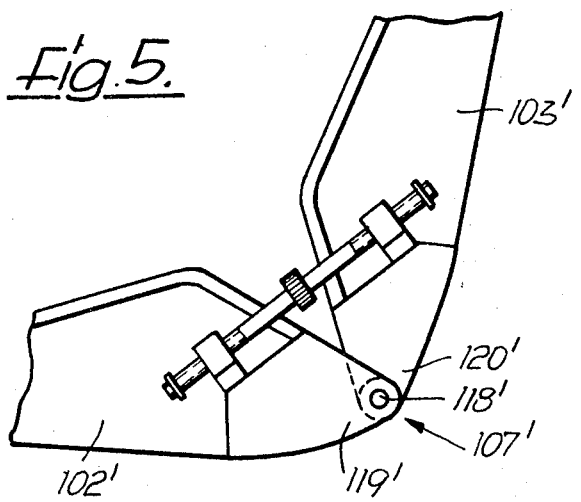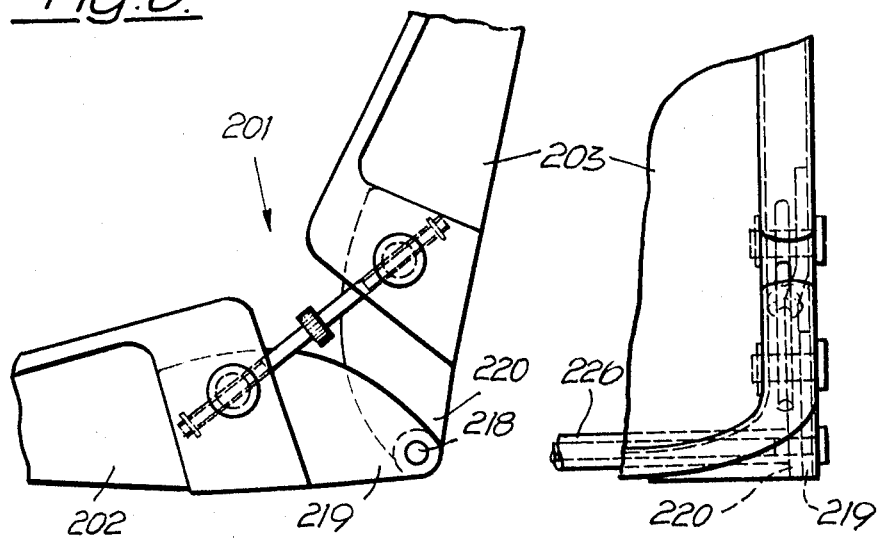

SEAT FOR A MOTOR VEHICLE

The present invention relates to a seat especially for a motor vehicle, which comprises a shell which carries the padding for the seat and backrest and the lateral sides of which are bent at least along a part of their length to a substantially upright position relative to the central part of the shell.

Each of the known seats of this type which are generally known as "bucket seats" comprises a shell the seat and backrest parts of which are integrally connected to each other and the lateral sides of which are bent to a substantially upright position relative to the central parts of the shell so as to form walls for laterally supporting the body of the seat occupant including his back and also for reinforcing the shell. Since the greatest bending strain to which such a seat is subjected occurs within the area in which the two shell parts carrying the seat padding and the back padding are connected to each other, this area of the projecting lateral walls of the shell is usually made of the greatest strength. The advantages of these known bucket seats, that is, the simple and light structure of the padding support and the good lateral support which it provides for the seat occupant are therefore countered by the disadvantage that the inclination of the backrest cannot be varied. Consequently, since in most modern motor vehicles neither the steering wheel nor the foot pedals are adjustable in the longitudinal direction of the vehicle, it is impossible to adjust the seat to the most suitable distance from the foot pedals and from the steering wheel by adjusting the seat part in accordance with the length of the legs of the driver and the inclination of the backrest in accordance with the length of his arms. The lack of such an adjustability is also a disadvantage insofar as an occupant of a seat may ride in a car for a much longer time without tiring if occasionally he can change the position of the seat by small alternations of the inclination of the backrest.

It is an object of the present invention to provide a seat which possesses the advantages of a conventional bucket seat as well as those of a seat with a backrest which is adjustable to different inclinations relative to the seat part. This object is attained according to the invention by providing a seat of the type as first described in which the lateral walls of the seat are interrupted between the part carrying the seat padding and the part carrying the back padding, and these two parts are connected to each other at least at one of the two walls by a device for adjusting the inclination of the backrest.

Since the padding support is made in the shape of a shell with lateral walls projecting upwardly from the seat part and forwardly from the backrest part, the seat according to the invention has the advantages of a bucket seat, namely of being of a simple and light basic structure and of providing the seat occupant with a good lateral support. By interrupting these lateral walls of the padding support between the seat and backrest parts the advantage may be attained that the backrest may be adjusted to different inclinations relative to the seat part. The backrest adjusting device which connects the two parts at least at one lateral side of the seat may then also serve as a bridging part of an adjustable length between the two lateral parts.

Especially if the shell itself forms a single integral element and the central or bottom part of the shell which connects the seat and backrest parts to each other is elastically deformable, the shell according to the invention will be practically as simple and of a similar low weight as the padding support of a conventional bucket seat. The desired elastic deformability or flexibility of this connecting part may be attained, for example, by making it of a curved shape in the longitudinal direction but straight in the transverse direction of the seat. According to a preferred embodiment of the invention, the transverse rigidity of this connecting part may be increased by providing it with reinforcements which extend in the transverse direction of the seat and may consist, for example, of stiffening corrugations.

The projecting lateral walls of the seat and backrest parts of the shell may also be connected to each other at each side of the seat by a hinge. If the common axis of these hinges is located within or closely adjacent to the plane of the mentioned connecting part, this part may be bent practically without being expanded or compressed when the backrest is pivoted to a different angle. In such a case, the connecting part does not have to be made of such an elasticity as to permit this part to be substantially expanded or compressed. This, however, is necessary if the common axis of the two hinges is spaced from the plane of this connecting part. The required elasticity of this connecting part may then be attained, for example, by corrugating it similar to a bellows. If the material of which the shell is made is not as easily deformable as required for this purpose, the seat and backrest parts thereof cannot be made integral with each other, but must be connected to each other by an intermediate strip which possesses the required elasticity in the longitudinal direction of the seat. Of course, if such an intermediate strip is employed, it may consist of a material which even if not provided with transverse corrugations has a sufficiently high elasticity so as to permit it to expand and contract as required when the backrest is pivoted relative to the seat part.

If the seat and backrest parts of the shell are connected by a pair of hinges, they may, of course, also consist of two separate elements. Such a seat construction still has the advantage over one which comprises a seat frame and a backrest frame that it is more simple and of a lighter weight and provides the seat occupant with a good lateral support and attains this support in a very simple manner.

The features and advantages of the present invention will become further apparent from the following detailed description thereof which is to be read with reference to the accompanying drawings, in which FIG. 1 shows a side view of a seat according to a first embodiment of the invention;

FIG. 2 shows a front view of a part of the seat according to FIG. 1;

FIG. 3 shows a side view of a part of a seat according to a second embodiment of the invention;

FIG. 4 shows a front view of the seat part as shown in FIG. 3;

FIG. 5 shows a side view of a part of a seat similar to that as shown in FIG. 3 but designed according to another modification of the invention;

FIG. 6 shows a side view of a part of a seat according to a further embodiment of the invention; while FIG. 7 shows a front view of a seat part as shown in FIG. 6.

Referring first to FIGS. 1 and 2 of the drawings, the motor-vehicle seat according to the invention comprises a shell-shaped padding support 1 which consists of a shell part 2 for holding the padding (not shown) for the seat part and a shell part 3 for holding the padding for the backrest. These two shell parts 2 and 3 of the padding support 1 are, however, integrally connected to each other by a connecting part 7.

The lower shell part 2 is provided in a similar manner as that of one of the conventional bucket seats with connecting feet 4 and 5 for bolting the seat to rails or to the floor, for example, of a car. The lateral wall 6 at each side of the shell part 2 increases in height from its front end toward the rear and then extends downwardly and terminates at the beginning of the strip-shaped connecting part 7 which is integral with the shell parts 2 and 3. Apart from an end portion 8 adjacent to the connecting part 7, the free edge portion 9 of the lateral walls 6 forms a downwardly open trough and thus a reinforced edge portion. Within the end portion 8, however, the marginal area 9 is drawn downwardly and then inwardly at the level of the bottom of the shell part 2 until it engages upon this bottom, as may be seen in FIG. 2, whereby the connecting foot 5 is also formed. Of course, the other side of the shell part 2 which is not shown is made of the same construction.

The front and central areas of the shell part 2 are slightly arched in the transverse direction of the seat, but its rear end adjacent to the connecting part 7 forms a surface which like that of the connecting part 7 is not curved in the transverse direction of the seat.

The shell part 3 which carries the padding of the backrest is provided like the shell part 2 with lateral walls 10 which extend upwardly from the bottom of this shell part and increase in height from their upper ends to a point near their lower edges which the shell part 2 faces and which terminate at the beginning of the connecting part 7. Therefore, contrary to the conventional bucket seats, the lateral walls of the shell are interrupted between the seat part 2 and the backrest part 3. Furthermore, like on the shell part 2, the free edge portions 11 of the lateral walls 10 are drawn outwardly so as to form a rearwardly open trough and their lower end portions 12 adjacent to the connecting part 7 are again drawn downwardly and then inwardly toward the bottom of the shell part 3.

The end portions 8 and 12 of the lateral walls 6 and 10 which are disposed within the same plane and are spaced from each other carry bearing pins 13 and 14 each of which is pivotably mounted in a substantially central position on the respective end portion 8 or 12 so as to be pivotable about an axis which extends at a right angle to the longitudinal plane of symmetry of the shell 1. Both bearing pins 13 and 14 are provided in corresponding positions with tapped bores which extend transverse to the axis of each pin and one of which is provided with a right-hand thread and the other with a left-hand thread. Into these two tapped bores the opposite threaded ends of an adjusting spindle 15 are screwed which are likewise provided with right or left-hand threads, respectively. The central part of this spindle 15 is provided with knurled handwheel 16 which is rigidly secured thereto. The pivotable bearing pins 13 and 14 together with the adjusting spindle 15 form a backrest adjusting device. When the handwheel 16 is turned in one or the other direction, the distance between the two bearing pins 13 and 14 will be varied and thereby the inclination of the shell part 3 relative to the shell part 2 will be increased or decreased accordingly. In this particular embodiment of the invention, both sides of the two shell parts are provided with such a backrest adjusting device.

When the inclination of the shell part 3 is varied in the manner as above described, the connecting part 7 which is not provided with any lateral wall portions is elastically deformed whereby its radius of curvature is changed. This elastic deformation may be easily attained because the connecting part 7 is not curved in the transverse direction of the seat. Instead of being stiffened like the other parts of the shell by their curvature in the transverse direction of the seat and by the lateral wall portions, the connecting part 7 is stiffened by parallel corrugations 17 which are laterally spaced from each other and extend transversely of the seat but do not affect the elastic deformability of this connecting part in the longitudinal direction of the shell which is necessary when the shell part 3 is pivoted to a different angle relative to the shell part 2.

The second embodiment of the invention as illustrated in FIGS. 3 and 4 differs substantially from the embodiment according to FIGS. 1 and 2 only by the fact that the two shell parts 102 and 103 at each side of the shell 101 are pivotably connected to each other by a hinge pin 118 which extends coaxially to the hinge pin at the other side and at a right angle to the central longitudinal plane of shell 101.

For supporting the hinge pins 118, each of the lateral sides 106 and 110 is provided with an extension 119 or 120, respectively, which extend toward and overlap each other and are provided with bores for receiving the hinge pins 118.

In this particular embodiment of the invention, the hinge pins 118 are spaced from the connecting part 107 which must therefore be able to expand or contract when the two shell parts are pivoted relative to each other. As shown in FIG. 3, the extensions 119 and 120 must therefore be separate from and not connected to the connecting part 107. This connecting part consists of a strip 121 which is straight in the transverse direction of the seat and is provided with corrugations which likewise extend in this transverse direction and the ends of which strip are secured to the adjacent ends of the bottom of the shell part 102 and of the shell part 103, respectively, which last ends are likewise not curved in the transverse direction of the seat. Due to these corrugations, strip 121 may be extended and contracted similar to a bellows. If shell 101 consists of a material which has a sufficient elasticity, the connecting strip 121 may also be integral with the two shell parts 102 and 103, but should likewise be provided with corrugations or the like.

For adjusting the inclination of the backrest relative to the seat part, each side of the shell 101 is provided with a backrest adjusting device which is provided in a similar manner as shown in FIGS. 1 and 2 with a threaded spindle 115 which has a handwheel 116 rigidly secured to its center and the opposite end parts of which are provided with right and left-hand threads, respectively. Each of these two ends of spindle 115 is screwed into a nut 122 or 123 which is connected by a rubber member 124 or 125 to the respective shell part 102 or 103. These rubber members which permit the nuts 122 and 123 to pivot to the required extent are secured to the rear connecting foot 105 or to a similar projection 126 on the shell part 103.

The free edges 109 and 111 of the lateral walls of the shell parts 102 and 103 of this embodiment of the invention do not extend in the form of a wide end portion back to the bottom of the respective shell part as in FIGS. 1 and 2, but they extend to a point near the end of the extension 119 or 120 and each of them defines a downwardly open trough. This embodiment of the invention agrees with that according to FIGS. 1 and 2 insofar as the bottoms of both shell parts 102 and 103 are slightly arched in the transverse direction of the seat with the exception of the end parts thereof directly adjacent to the connecting part 107.

As illustrated in FIG. 5, it is, however, also possible to modify the embodiment of the invention as shown in FIGS. 3 and 4 by designing the extensions 119' and 120' so that the longitudinal axis of the hinge pins 118' will be located closely adjacent to the plane of the connecting part 107'. When the shell parts 102' and 103' are then pivoted relative to each other, the connecting part 107' will not be expanded or contracted but merely subjected to bending stresses. This is especially of advantage if the connecting part 107' is integrally connected to the two shell parts 102' and 103'. The connecting part 107' will then be subjected to the same stresses as the connecting part 7 of the embodiment according to FIGS. 1 and 2 and, if desired, it may also be designed in the same manner.

FIGS. 6 and 7 illustrate a further embodiment of the invention in which the two shell parts 202 and 203 form two separate elements and the extensions 219 and 220 of the lateral walls of these shell parts are integral with their respective bottom parts which in the other embodiments together form the connecting part 7, 107, or 107', respectively. The extensions 219 and 220 extend so far toward the rear or downwardly, respectively, that the two hinge pins 218 may be located behind the seat padding. The two extensions 220 of the shell part 203 carrying the back padding may therefore be positively secured to each other by a connecting tube. In this event, it is only necessary to provide a backrest adjusting device only on one side of the seat. This adjusting device may be of the same construction as shown in FIGS. 1 and 2 and therefore the adjacent end portions of the lateral walls of the two shell parts are designed like the end portions 8 and 12 as shown in FIGS. 1 and 2 rather than like those as shown in FIGS. 3 and 4.

In all embodiments of the invention it is possible to provide the lateral walls at each side of both shell parts with a common cover of an elastic material which therefore also bridges the gap between the adjacent ends of the two shell parts above the connecting part 7 or 107 and is merely provided with an aperture through which a part of the handwheel 16 or 116 projects. Of course, the backrest adjusting device may in all embodiments of the invention also be of a construction different from those as illustrated and instead of being infinitely variable as by an adjusting spindle, such a device may also be designed so as to adjust the backrest in steps from one inclined position to another and to lock it in either of these positions. The lateral walls of the two shell parts also do not need to be made of such a height from their bottom surfaces as illustrated without departing from the other structural features and the merits of the invention.

Although my invention has been illustrated and described with reference to the preferred embodiments thereof, I wish to have it understood that it is in no way limited to the details of such embodiments but is capable of numerous modifications within the scope of the appended claims.

I claim:

1. A seat, especially suitable for a motor vehicle, comprising a shell adapted to carry the padding for said seat, said shell comprising a seat part and a backrest part, each of said parts having a bottom wall and lateral walls projecting upwardly from said bottom wall at both sides thereof, and extending at least along a part of the length of the respective shell part for laterally supporting the occupant of said seat, said lateral wall at each side of said seat part forming a part separate from the adjacent lateral wall of said backrest part, first connecting means for connecting the adjacent ends of said bottoms to each other, and second connecting means for adjustably connecting said lateral walls of at least one side of said shell to each other and adapted to be adjusted so as to vary the inclination of said seat and backrest parts relative to each other, and said bottom-connecting means comprising a connecting strip intermediate the adjacent ends of the bottoms of said seat and backrest parts and securing them to each other and being elastically deformable when said inclination being varied.

2. A seat as defined in claim 1, in which said connecting strip integrally connects said bottoms of said seat and backrest parts to each other.

3. A seat as defined in claim 1, in Which each surface line of said connecting strip extending transverse to the longitudinal direction of said shell is rectilinear.

4. A seat as defined in claim 1, in which said connecting strip is provided with parallel reinforcements extending transverse to the longitudinal direction of said shell.

5. A seat as defined in claim 4, in which said connecting strip is provided with parallel stiffening corrugations forming said reinforcements.

6. A seat as defined in claim 1, further comprising hinge means for pivotably connecting said lateral walls at each side of said shell to each other.

7. A seat as defined in claim 1, further comprising hinge means for pivotably connecting said lateral walls at both sides of said shell to each other and having a common axis located closely adjacent to said connecting strips.

8. A seat as defined in claim 1, further comprising hinge means for pivotably connecting said lateral walls at both sides of said shell to each other and having a common axis spaced from the upper surface of said connecting strip, said connecting strip being adapted to expand or contract in the longitudinal direction of said shell when said inclination is varied.

9. A seat as defined in claim 8, in which said connecting strip has a substantially bellowslike cross section.

10. A seat as defined in claim 1, in which said two shell parts form two separate elements, said first connecting means forming hinge members pivotably connecting the adjacent ends of both sides of said shell parts to each other and having a common axis located closely adjacent to said bottoms.

11. A seat as defined in claim 10, further comprising a rod-shaped member extending transverse to the longitudinal direction of said shell and positively connecting said hinge members at the opposite sides of one of said shell parts to each other.